United States Patent [19]

Vernon

[11] 4,024,544
[45] May 17, 1977

[54] MENISCUS DAMPENING DROP GENERATOR

[75] Inventor: Richard H. Vernon, Richardson, Tex.

[73] Assignee: Xerox Corporation, Stamford, Conn.

[22] Filed: Nov. 21, 1975

[21] Appl. No.: 634,314

[52] U.S. Cl. .................................. 346/1; 346/140 A
[51] Int. Cl.² ........................................ G01D 15/16
[58] Field of Search ........................ 346/140, 75, 1; 239/101, 102; 310/8.1, 8.3

[56] References Cited

UNITED STATES PATENTS

| 3,747,120 | 7/1973 | Stemme | 346/140 X |
| 3,930,260 | 12/1975 | Sicking | 346/140 |

Primary Examiner—Joseph W. Hartary
Attorney, Agent, or Firm—Sheldon F. Raizes

[57] ABSTRACT

An ink jet includes a meniscus dampening passage, which carries a pressure front timed to arrive within an effective meniscus dampening vicinity of a droplet outlet orifice at substantially the same instant that a droplet leaves the orifice to dampen substantially the full period of meniscus vibration.

18 Claims, 15 Drawing Figures

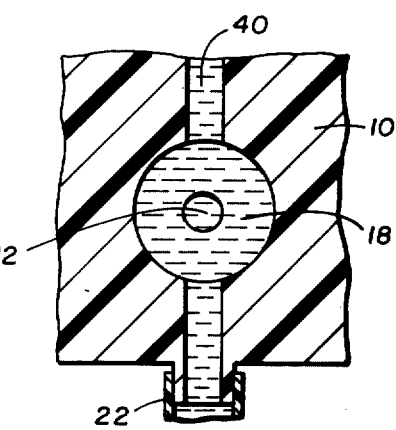
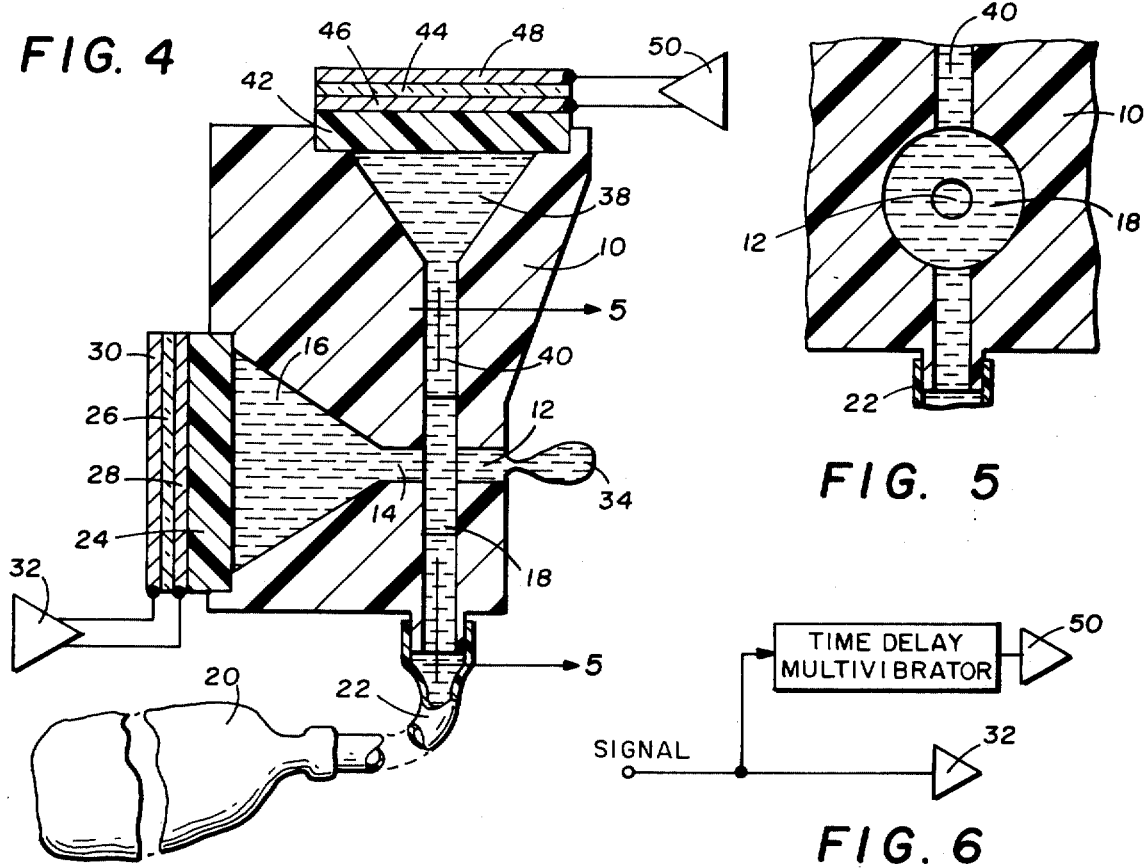
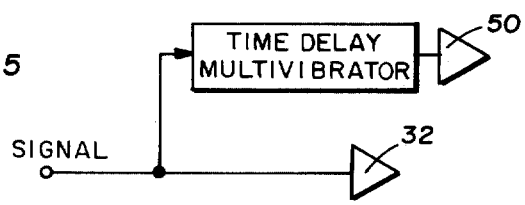
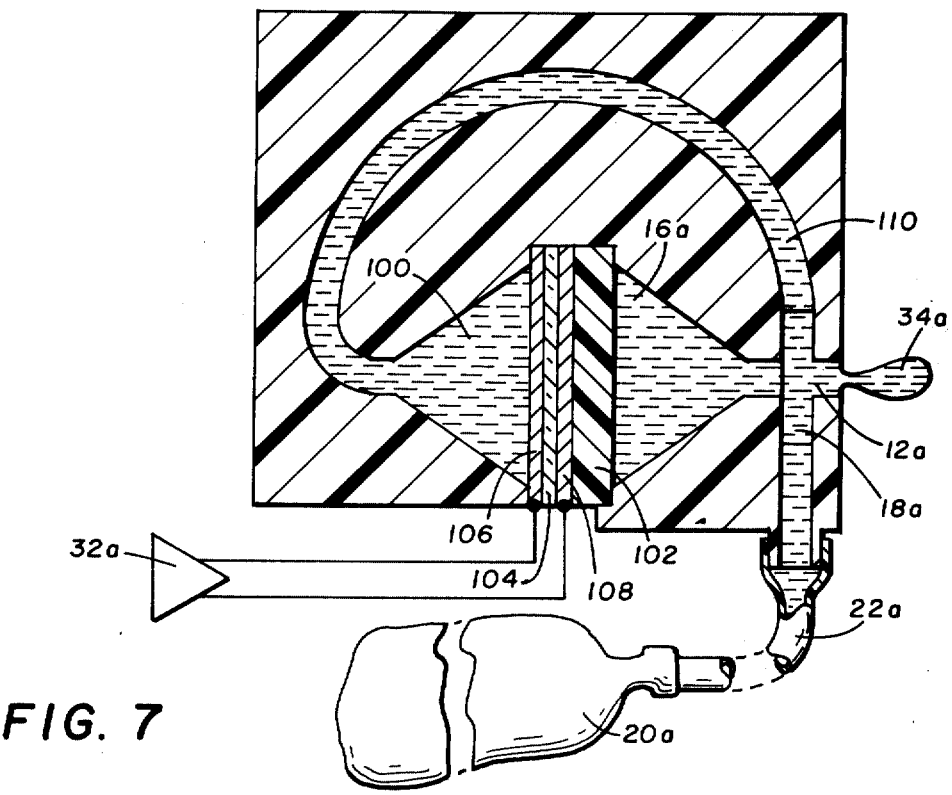

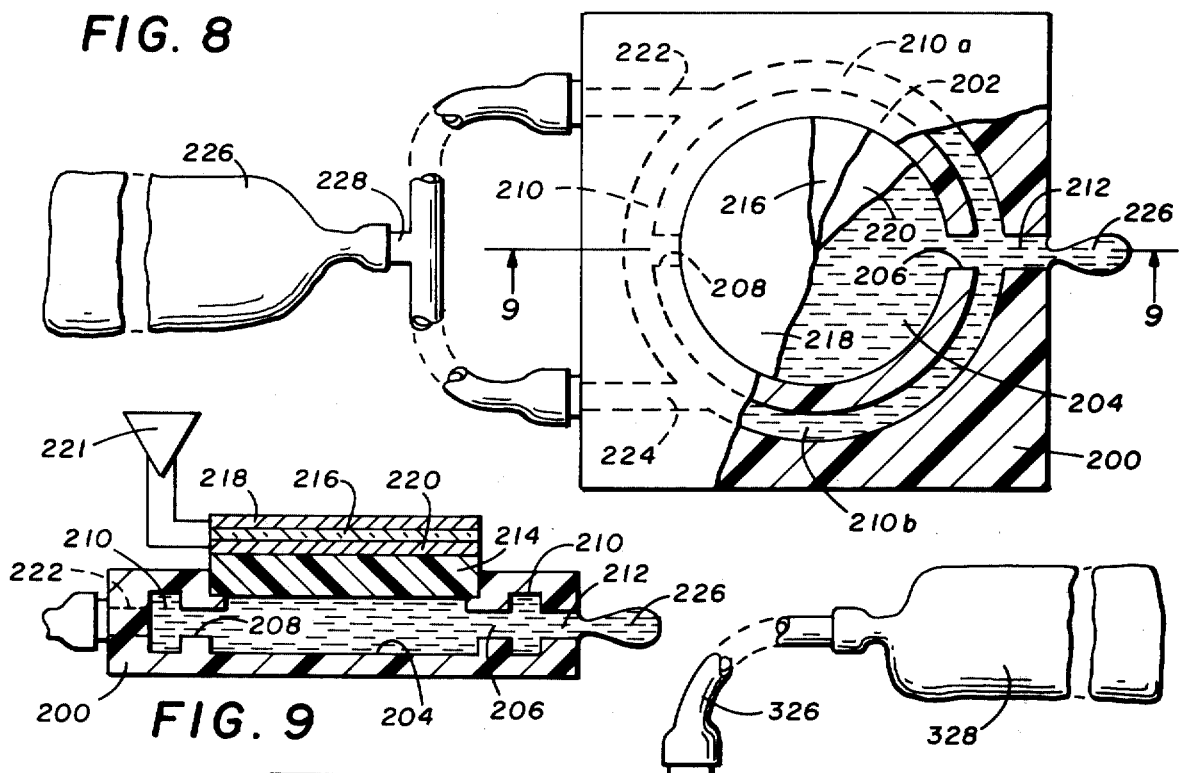
FIG. 8
FIG. 9
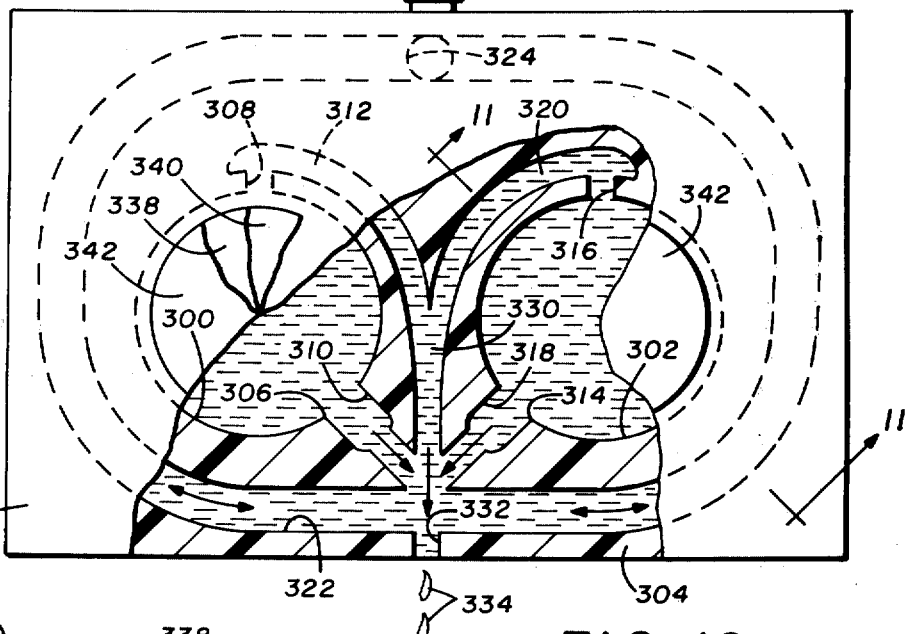
FIG. 10
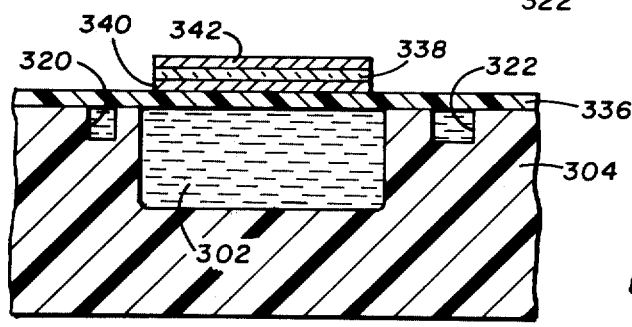
FIG. 11

MENISCUS DAMPENING DROP GENERATOR

DESCRIPTION OF THE INVENTION

When an ink droplet is expressed from a droplet outlet orifice, the new meniscus formed in the orifice, after the droplet leaves the same, vibrates until it reaches a stable condition. Since the meniscus must be stabilized in order to express controlled droplets, this period of vibration affects the frequency in which the droplets can be expressed through the orifice. The longer the period of vibration, the lower the frequency or the shorter the period of vibration, the higher the frequency.

It is an object of this invention to provide an ink jet with a meniscus dampening means, which shortens the time of meniscus vibration and thereby increases the frequency in which droplets may be expressed through the outlet orifice.

Other objects of the invention will become apparent from the following description with reference to the drawings wherein:

FIG. 4 is a view of an ink jet assembly incorporating the principle of the invention;

FIG. 5 is a view taken along section line 6—6 of FIG. 5;

FIG. 6 is a schematic of an electric flow diagram;

FIG. 7 is a sectional view of a modification of the embodiment of FIGS. 4–6;

FIG. 8 is a view of another modification of the embodiment of FIG. 7;

FIG. 9 is a view taken along section line 9—9 of FIG. 10;

FIG. 10 is a cutaway view of a coincidence ink jet incorporating the principle of the invention; and FIG. 11 is a view taken along section line 11—11 of FIG. 9.

Figure 1:
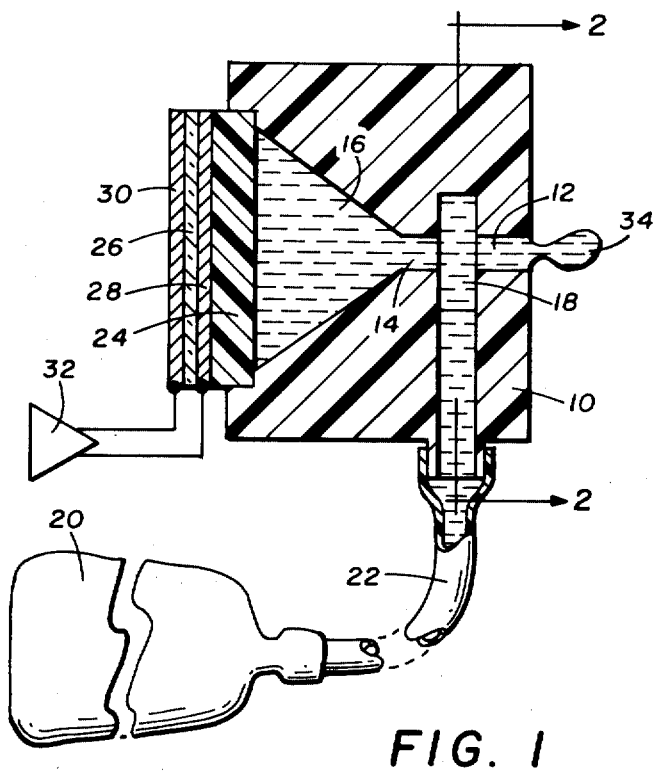
FIG. 1 is a sectional view of a prior art ink jet assembly.
Figure 2:
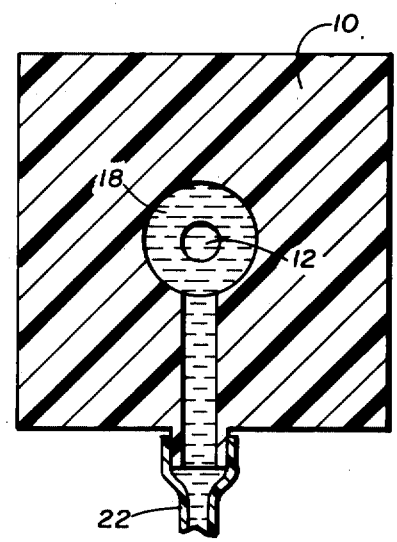
FIG. 2 is a view taken along section line 2—2 of FIG. 1.

Referring to FIGS. 1 and 2, a prior art ink jet assembly is illustrated comprising a housing 10 having an ink jet outlet orifice 12, which is aligned with an outlet passage 14 of a pressure chamber 16. A circular fluid supply chamber 18 is interposed between the outlet orifice 12 and the pressure chamber outlet passage 14. A flexible bag 20 serves as an ink reservoir and is communicated to the passage 18 by a conduit 22. The cross-sectional area of the passage 14 is the same (but not necessarily) as the cross-sectional area of the orifice. A thin, flexible membrane 24 is sealed to the housing 10 and forms an outer wall of the chamber 16. The membrane 24 has attached thereto a plate 26 with piezoelectric properties, which is sandwiched between and bonded to a pair of electrodes 28 and 30 with the electrode 28 being bonded to the membrane 24. The piezoelectric plate 24 is polarized during the manufacture thereof to contract in a plane parallel to the plane of a membrane 24 when excited by applying a proper voltage across the electrodes 28 and 30. The contraction of the piezoelectric plate 26 will exert a likewise stress on the membrane 24 to cause the membrane to deform or buckle to decrease the volume of the chamber 16. An electronic driver 32 is connected to the electrodes 28 and 30 for applying a voltage thereacross.

The electronic driver 32 comprises a pulse shaper and amplifier and a pulse power amplifier, each of which is well known. The pulse shaper and pulse amplifier include components to vary the rise time, fall time, voltage amplitude and electrical pulse width. The pulse power amplifier comprises a transistor driven between a non-conducting state and a state of saturated conduction in response to positive-going pulse-like input signals supplied to the base of the transistor.

The above-described prior art embodiment is very similar to the ink jet assembly described in Stemme U.S. Pat. No. 3,747,120. Upon activation of the piezoelectric plate 26, the membrane 24 deflects to generate a pressure increase in the fluid in chamber 16, which results in an ink droplet 34 being expressed from the orifice 12.

Figure 3A:
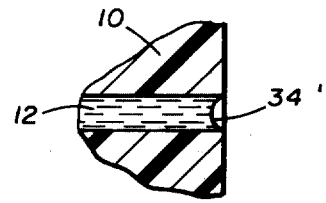
FIGS. 3A–3E are views showing the progressive shape of a meniscus prior to and after an ink droplet is expressed from an orifice.
Figure 3B:
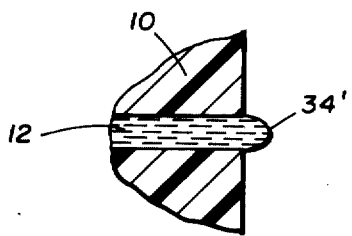
Figure 3C:
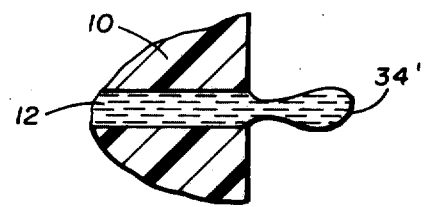
Figure 3D:
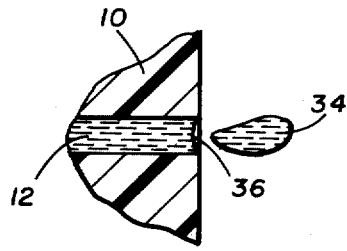
Figure 3E:
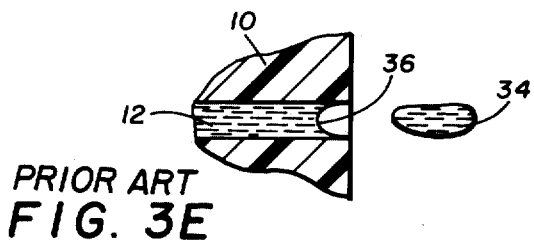

Referring to FIGS. 3A–3E, a typical meniscus to droplet shape diagram is illustrated with respect to a time lapse following a generation of pressure in the fluid in pressure chamber 16. FIG. 3A illustrates the typical shape of a meniscus 34' at the time an electrical signal is transmitted to the piezoelectric crystal to apply a pressure pulse on the liquid in chamber 16. FIG. 3B illustrates the shape of the meniscus 34' at the termination of the electrical signal. FIG. 3C illustrates the shape of the meniscus 34', which has now been elongated and is about ready to break away from the orifice 12 as a droplet 34 (FIG. 3D). FIG. 3D illustrates the droplet 34 as it leaves the orifice 12 and also illustrates a newly formed meniscus 36. When the voltage applied across the electrodes 28 and 30 is terminated thereby relaxing the piezoelectric crystal 26 and the membrane 24, the membrane will return to its normal position creating a pressure decrease in pressure chamber 16, which causes fluid in supply chamber 18 to be drawn into the chamber 16. However, this pressure decrease also is applied to the fluid in the orifice 12, which causes the meniscus 36 to be drawn back into the orifice as illustrated in FIG. 3E. The meniscus 36 will vibrate back and forth until it reaches a stable condition whereupon it will take the position as shown for meniscus 34' in FIG. 3A. The amplitude or degree of this vibration of meniscus 36 limits the frequency response for the ejection of ink through the same orifice 12 since the meniscus 36 must reach a sufficiently stable condition before expression of another controlled droplet. For instance, if it takes 200 microseconds for the meniscus 36 to reach a sufficiently stable condition, then electrical pulsing must take place at no less than 300 microsecond intervals for subsequent ejection. Also, there is a possibility of ingestion of air into the system if the meniscus vibration amplitude is too large. While the prior art embodiment discloses an ink jet with a fluid rectifier 18 for supplying fluid to the chamber 16, the same meniscus vibration characteristic is applicable to ink jets, which do not have a fluid rectifier as, for instance, ink jets similar to those disclosed in Zoltan U.S. Pat. 3,683,212 and Arndt U.S. Pat. No. 3,832,579.

It is the purpose of the instant invention to dampen the meniscus vibration amplitude and thereby decrease the time of meniscus stabilization resulting in increasing the ink droplet expression frequency and also prevent the ingestion of air into the system. This is accomplished in one manner by the provision of a second pressure chamber 38 (see FIGS. 4 and 5), which will hereinafter be referred to as a meniscus dampening chamber. The chamber 38 is communicated to the fluid supply chamber 18 by a tubular passage 40, the axis of which intersects the axis of orifice 12 and passage 14. A thin, flexible membrane 42 is sealed to the housing 10 and forms an outer wall of the chamber 38. The membrane 42 has attached thereto a piezoelectric plate 44, which is sandwiched between and bonded to a pair of electrodes 46 and 48 with the electrode 48 being bonded to the membrane 42. An electronic driver 50 is connected to the electrodes 46 and 48 for applying a voltage thereacross. The electronic driver 50 is the same as the electronic driver 32. Activation of the piezoelectric plate 44 by electronic driver 50 will cause the membrane 42 to deflect thereby effecting a pressure increase in the liquid in chamber 38 and passage 40 resulting in a pressure front from the meniscus dampening chamber 38 and counteracting the vibration of the meniscus 36 when the meniscus is in its vibrating stage. This phenomenon is created by having the driver 50 apply a proper voltage across the electrodes 46, 48 thereby activating piezoelectric plate 44 and creating a pressure front in meniscus dampening chamber 38 after a pressure increase has been applied to the liquid in the chamber 16 (see FIG. 6). The time lapse between applying electrical pulses to the piezoelectric plates of the two chambers is determined by the hydraulic design of the system. The voltage applied to piezoelectric plate 44 is such that the pressure increase in the liquid in the meniscus dampening chamber 38 will be of such a magnitude and duration that a pressure front in conduit 40 resulting from the pressure increase will arrive within an effective meniscus dampening vicinity of the orifice 12 at substantially the same instant that the droplet 34 leaves the orifice 12 to dampen substantially the full period of meniscus vibration until the meniscus reaches a sufficiently stable condition. Obviously, the pressure increase in the liquid of meniscus dampening chamber must not be of a magnitude that a droplet will be expressed thereby from the orifice 12. Generally, the magnitude of the voltage and duration thereof transmitted by the driver 50 will be less than the voltage and of shorter duration that that transmitted by the driver 32. Fluid is drawn from the supply chamber 18 into passage 40 upon return of the membrane 42 when the voltage across the electrodes 46 and 48 is terminated.

Referring to FIG. 7, a modification of the embodiment of FIGS. 4-6 is shown. Those elements, which are the same as the embodiments of FIGS. 4 and 5, are designated by the same reference numeral, only with an "a" affixed thereto. In this embodiment, a meniscus dampening chamber 100 and the pressure chamber 16a share a common membrane 102. A piezoelectric plate 104 is sandwiched between a pair of electrodes 106, 108 with the electrode 108 being bonded to the membrane 102. A passage 110 communicates chamber 100 with the fluid supply chamber 18a and enters the same at such an angle that a liquid jet expressed therefrom will pass between and intersect the axis of the orifice 12a and the outlet 14a. Upon a voltage being applied across the electrodes 106 and 108 to activate piezoelectric plate 104, the membrane 102 deflects in a direction to decrease the volume of transducer chamber 16a to thereby increase the pressure in the fluid in chamber 16a. At the same time, the chamber volume 100 increases thereby drawing fluid from fluid supply chamber 18a into passage 110. When the voltage across the electrodes 106, 108 is terminated, membrane 102 returns to its normal position decreasing the volume of chamber 100 thereby providing a pressure increase in passage 110. The size and length of the passage is such that the pressure front in passage 110 arrives within an effective meniscus dampening vicinity of the orifice 12a at substantially the same instant as the droplet leaves the orifice 12a to dampen substantially the full period of meniscus vibration. Obviously, the dampening pressure front must not be of a magnitude that a droplet will be expressed thereby from the orifice 12a.

Referring to FIGS. 8 and 9, there is illustrated still another modification of the embodiment of FIGS. 4 and 5. A housing 200 comprises a circular wall 202 defining a transducer chamber 204. A pair of diametrically oppositely located ports 206 and 208 is located in the wall 202 and communicates with a circular meniscus dampening passage 210, which has two semicircular segments 210a and 210b. The circular passage 210 passes between a droplet outlet orifice 212 and port 206 with the droplet outlet orifice 212 being aligned with port 206. The cross-sectional area of port 206 is smaller than that of port 208 for reasons to be hereinafter discussed. A thin flexible membrane 214 spans the chamber 204 and is sealed to the housing 200 and forms an outer wall of the chamber 204. A piezoelectric plate 216 is sandwiched between a pair of electrodes 218 and 220 with the electrode 220 being bonded to the membrane 214. An electronic driver 221 is connected to the electrodes 218 and 220. A pair of fluid supply passages 222, 224 communicated with an ink supply reservoir 226 by conduit 228. The passages 222 and 224 are communicated with the semicircular meniscus dampening passage segments 210a and 210b, respectively, on opposite sides of port 208. The cross-sectional area of each passage 222 and 224 is preferably greater than the cross-sectional area of passage 210 although it may be the same.

When the driver 221 applies a voltage across the electrodes 218 and 220 to activate piezoelectric plate 216, the volume in chamber 204 will decrease thereby effecting pressure on the liquid therein. Although port 208 is larger than port 206, the path of least impedance for the liquid in chamber 204 will be through the port 206 since the port 208 is located opposite one wall of the passage 210, and the liquid momentum force vector at the port 208 is substantially perpendicular to the directional path in which liquid must be displaced in passage 210. Since the path of least impedance is through port 206, an ink droplet 226 is expressed through the orifice 212. A liquid stream expressed through port 208 will strike the wall of passage 210 and be split in two opposite directions along passages 210a and 210b. The angle of approach of supply inlet passages 222 and 224 to the meniscus dampening passage 210 is such that the pressure front in the passages 210a and 210b will substantially pass the inlet passages 222 and 224 without losing significant pressure. The length of each half 210a and 210b of the meniscus dampening passage 210 is such that the pressure front in each half passage 210a and 210b will arrive within an effective meniscus dampening vicinity of the orifice 212 at substantially the same instant that the droplet leaves the orifice 212 to dampen substantially the full period of meniscus vibration. Again, the pressure front in passage 210 must not be of a magnitude that a droplet will be expressed thereby from the orifice 212.

When the voltage across the electrodes 218 and 220 is terminated, the membrane 214 returns to its normal position creating low pressure in chamber 204. This low pressure is primarily satisfied by drawing liquid from passage 210 through the port of least impedance, which is the larger port 208. Liquid is supplied to passage 210 by the inlet passages 222 and 224. A very minor part of the required supply liquid will be drawn through port 206. The system is designed that this amount will not be significantly enough to disturb the dampening function of the pressure front in passage 210.

Referring to FIGS. 10 and 11, there is illustrated a coincidence ink jet assembly to which the principle of this invention has been applied. A coincidence jet assembly is the subject matter of copending U.S. application, Ser. No. 625,988, Filed Oct. 28, 1975, entitled "Coincidence Ink Jet", (common assignee), and comprises two liquid ink pressure passages and a droplet outlet orifice. Each of the pressure passages is communicated to a respective pressure chamber. An ink droplet is expressed from the outlet orifice only when the liquid in both the pressures passages has a simultaneous increase in pressure.

Referring to FIG. 10, a pair of pressure chambers 300 and 302 is provided in a housing 304. The chamber 300 has a pair of ports 306, 308 leading to a pressure passage 310 and a meniscus dampening passage 312, respectively. The chamber 302 has a pair of ports 314, 316 leading to a pressure passage 318 and a meniscus dampening passage 320, respectively. The cross-sectional area of each of the ports 306 and 314 is greater than the cross-sectional area of each of the ports 308 and 316. Fluid pressure passages 310 and 318 lead from the chambers 300, 302, respectively, to a liquid ink supply passage 322 where the three passages intersect. The liquid ink supply passage 322 is communicated to a port 324, which in turn is communicated through a conduit 326 to an ink supply reservoir 328, located remotely from the housing, which comprises a sealed flexible bag. The meniscus dampening passages 312 and 320 merge into a single meniscus dampening passage 330, which in turn intersects the pressure passages 310, 318 at their intersection. Also, at the intersection is an outlet orifice 332 through which ink droplets 334 are expressed onto a copy medium.

Referring to FIG. 11, the chambers and passages are sealed by a flat flexible layer 336 bonded to the member housing 304. The pressure chambers and passages are completely filled with liquid ink. A piezoelectric plate 338 is sandwiched between and bonded to a pair of electrodes 340 and 342 with the electrode 342 being bonded to the layer 336 thereby effectively bonding the piezoelectric plate 338 thereto.

When the piezoelectric plate for either pressure chamber 300 or 302 is activated, by an electrical signal, a fluid pressure increase will occur in the liquid in a respective one of passages 310 and 318 causing displacement of ink along the respective passage. The passages 310 and 318 are at such an angle relative to the orifice 332, the impedance to liquid flow in passage 322 relative to the impedance to liquid flow in orifice 332, and the magnitude and duration of a pressure increase exerted on the liquid in pressure chambers 300, 302 are designed that the ink stream expressed from only one passage at a time will entirely miss orifice 332 and displace the ink in the ink supply passage 322 while the ink within orifice 332 will not be disturbed to the extent of expressing a droplet therethrough. The orifice 332 is so located relative to the intersection of the passages 310, 314 and the magnitude and duration of the pressure increase exerted on the liquid in the pressure chambers 300, 302 are so designed that the summation vector of the fluid momentum vectors in passages 310 and 318 will lie on the axis of the orifice 332. Thus, only when the piezoelectric members for both pressure chambers 300, 302 are simultaneously activated, thereby applying simultaneous pressure increases in the liquid in each of passages 310, 318, will an ink droplet 334 be expressed from orifice 332.

Referring now to the meniscus dampening passages 312, 320, the path of least impedance for liquid in each chamber, upon a pressure applied thereto, is through ports 306 or 314. However, ports 308 and 316 are designed to allow sufficient liquid thereto to provide a pressure front in passage 330. The ports 308, 316, passages 312, 320, 330 and the pressure increase magnitude and duration are designed that the pressure front will arrive within an effective meniscus dampening vicinity of the orifice 332 at substantially the same instant the droplet leaves orifice 332 to dampen substantially the full period of meniscus vibration. Also, the magnitude of the combined pressure fronts in passage 330 resulting from simultaneous pressure increases in the liquid in chambers 300 and 302 will not be such that a droplet will be expressed thereby through orifice 332.

When a voltage is applied to a piezoelectric plate of only one pressure chamber at a time resulting in a jet stream being expressed from either passage 310 or 318, there is a slight effect on the meniscus in orifice 332, which causes the same to vibrate. The corresponding pressure front in either meniscus dampening passage 312 or 320 created by the pressurized chamber will act to dampen such vibration to stabilize the meniscus in the orifice 332 prior to the next voltage application to the piezoelectric plate of the same chamber. At the termination of a pressure increase, ink is drawn from supply passage 322 mainly into the passage 310 or 318 from which ink was expressed and a relatively small amount of ink will be drawn into a corresponding meniscus dampening passage 312 or 320.

Rather than providing both chambers 300 and 301 with a meniscus dampening passage, only one chamber could have such a passage. Since both chambers must be simultaneously pressurized to express an ink droplet, a pressure front created in the meniscus dampening passage of one chamber can be designed to dampen the meniscus vibration.

The aforedescribed coincidence ink jet has specific utilization in a matrix actuation system where either a large number of jets or a dense linear jet array is employed since substantially fewer pressure chambers than the number of jets utilized are required. Theoretically, since two independent pressure chambers are required to effect expression of an ink droplet through a jet, the number of pressure chambers required in a matrix actuation system is twice the square root of the number of jets. For example, theoretically, only 120 pressure chambers are needed for 3600 jets with each jet orifice being communicated to two pressure chambers. However, as the number of jets increases in a system, the number of jets communicated to one pressure chamber will be hydraulically limited and, therefore, more pressure chambers may be required. For instance, the practical number of pressure chambers for a 3600-jet assembly may range between 120 and 400. In this instance, a housing would be provided with a plurality of pressure chambers, each serving a number of ink jets.

In all of the above embodiments, the housing and membranes may comprise any well-known material such as plastic, glass or ceramic.

What is claimed is:

1. A liquid drop generator comprising: a droplet outlet orifice, a droplet producing pressure chamber means operatively communicated with said orifice to express a liquid droplet therethrough, passage means, said passage means being arranged to direct liquid into an effective meniscus vibration dampening zone adjacent said droplet outlet orifice, means for effecting a pressure increase in the liquid in said chamber means, means for effecting a pressure increase in the liquid in said passage means, the magnitude and duration of said pressure increase in the liquid in said chamber means being of such nature to express a liquid droplet from said droplet outlet orifice, the magnitude and duration of said pressure increase in the liquid in said passage means and said passage means being of such nature to provide a pressure front at said effective meniscus dampening zone to dampen the vibration amplitude of the meniscus formed in said outlet orifice after a droplet is expressed therefrom by said pressure increase effected in the liquid in said chamber means.

2. The structure as recited in claim 1 wherein said passage means is communicated to said chamber means, said pressure increase in the liquid in said chamber means effecting said pressure increase in the liquid in said passage means.

3. The structure as recited in claim 2 wherein said pressure chamber means is one chamber.

4. The structure as recited in claim 1 further comprising a meniscus dampening chamber, said passage means communicating with said dampening chamber, said pressure increase in said liquid in said passage means being effected by a pressure increase in the liquid in said dampening chamber, and means for effecting said pressure increase in liquid in said dampening chamber a predetermined period after said pressure increase is effected in liquid in said pressure chamber means.

5. The structure as recited in claim 1 further comprising a menicus dampening chamber, said passage means communicating with said dampening chamber, a flexible member between said dampening chamber and said pressure chamber means forming a common wall, means for deflecting said flexible member and allowing the same to return to a non-deflected position to a first decrease the volume of said pressure chamber and increase the volume of said dampening chamber to effect said pressure increase in the liquid in said pressure chamber and thereafter upon return of said flexible member to a non-deflected position decreasing the volume of said dampening chamber to effect said pressure increase in the liquid in said passage means.

6. The structure as recited in claim 1 wherein said pressure chamber means comprises two pressure chambers each having an outlet passage means communicating said pressure chambers to said droplet outlet orifice, said outlet passage means intersecting each other adjacent said droplet outlet orifice, said outlet passage means and said outlet orifice being arranged relative to each other that a droplet is expressed from said orifice only when the liquid in said two chambers has a simultaneous pressure increase.

7. The structure as recited in claim 6 wherein said first named passage means is communicated to each of said two chambers, said pressure increase in the liquid in each of said two chambers effecting said pressure increase in the liquid in said first named passage means.

8. The structure as recited in claim 7 wherein said first named passage means intersects said outlet passage means at said intersection.

9. The structure as recited in claim 1 further comprising a fluid supply chamber means, second passage means communicated with said pressure chamber means opening into said fluid supply chamber means, said droplet outlet orifice being communicated with said fluid supply chamber means, said first named passage means opening into said fluid supply chamber means, said fluid supply chamber means being located between said outlet orifice and said second passage means.

10. The structure as recited in claim 9 wherein said first named passage means is communicated to said pressure chamber means, said pressure increase in the liquid in said pressure chamber means effecting said pressure increase in the liquid in said first named passage means.

11. The structure as recited in claim 10 wherein said pressure chamber means is one chamber.

12. The structure as recited in claim 9 further comprising a meniscus dampening chamber, said first named passage means communicating with said dampening chamber, said pressure increase in the liquid in said first named passage means being effected by a pressure increase in the liquid in said dampening chamber, and means for applying said pressure increase in the liquid in said dampening chamber a predetermined period after said pressure increase is effected in the liquid in said pressure chamber means.

13. The structure as recited in claim 9 further comprising a meniscus dampening chamber, said first named passage means communicating with said dampening chamber, a flexible member between said dampening chamber and said pressure chamber means forming a common wall, means for deflecting said flexible member and allowing the same to return to a non-deflected position to first decrease the volume of said pressure chamber and increase the volume of said dampening chamber to effect said pressure increase in liquid in said pressure chamber and thereafter upon return of said flexible member to a non-deflected position decreasing the volume of said dampening chamber to effect said pressure increase in liquid in said first named passage means.

14. The structure as recited in claim 9 wherein said pressure chamber means comprises two pressure chambers each having an outlet passage means communicating said pressure chambers to said droplet outlet orifice, said outlet passage means intersecting each other and opening into said fluid supply chamber means, said second passage means being said outlet passage means, said outlet passage means and said outlet orifice being arranged relative to each other that a droplet is expressed from said orifice only when the liquid in said two pressure chambers has a simultaneous pressure increase.

15. The structure as recited in claim 14 wherein said first named passage means is communicated to each of said two pressure chambers, said pressure increase in the liquid in each of said two chambers effecting said pressure increase in the liquid in said first named passage means.

16. The structure as recited in claim 15 wherein said first named passage means intersects said outlet passage means at said intersection.

17. The structure as recited in claim 6 wherein said first named passage means is communicated to at least one of said two chambers, said pressure increase in the liquid in said one chamber effecting said pressure increase in the liquid in said first named passage means.

18. A method for dampening a meniscus vibration amplitude in a liquid drop generator comprising: effecting a first pressure to express a liquid droplet through an outlet orifice, said expression of the droplet by the first pressure resulting in an inherent meniscus vibration amplitude after the droplet leaves the orifice, substantially dampening said inherent meniscus vibration amplitude and thereby decreasing the period of meniscus stabilization by generating a pressure front of such magnitude and duration within an effective meniscus dampening vicinity of the outlet orifice at substantially the same instant the droplet leaves the orifice.

* * * * *